Patented Dec. 12, 1950

2,533,525

UNITED STATES PATENT OFFICE 2,533,525

POLYMERIZATION OF STYRENE EMPLOYING PHTHALIMIDE AS CATALYST

Francis H. Snyder, New Rochelle, N. Y., assignor to Irving L. Rabb, New York, N. Y.

No Drawing. Application March 17, 1947, Serial No. 735,252

7 Claims. (Cl. 260—93.5)

This invention relates to a method of producing polystyrene, more particularly to an improved bulk process of producing polystyrene under substantially anhydrous conditions.

The many advantages of polystyrene resins have recommended their widespread use. These resins are characterized by a very large number of desirable properties such as excellent electrical properties, marked resistance to water and chemicals, a high clarity, low specific gravity and an excellent amenability to the reception of colors. The polystyrene resins similarly are readily fabricated and can be formed by injection molding or extrusion and where large area castings are required, by compression molding. In fabrication, marked advantages lie in the quite rapid injection molding cycle and the substantially complete utilization of all scrap.

A considerable proportion of the polystyrene resins used is produced in plants which utilize the monomeric styrene as the starting material. The monomer may be produced by admixing with inhibitors which makes it possible to store the liquid monomer and to ship it without danger of gelling. The inhibitors used for the monomer are usually substituted phenols such as para-tertiary-butyl-phenol. The older method of producing polystyrene from the monomer was quite slow or prolonged and essentially involved the reaction of the monomer in the form of an aqueous dispersion or emulsion. The water present in the system was, in the past, found to be necessary in order to dissipate and absorb the very high heat of the polymerization reaction. In the past, attempts to carry out a bulk polymerization of the monomer without the presence of a heat dissipating medium such as substantial quantities of water, were unsuccessful and in many instances ended in disastrous explosions.

It has now been ascertained that monomeric styrene may be polymerized in a bulk reaction to produce polystyrene which reaction is effective without the employment of water or equivalent absorption adjuvant. As will be seen, the efficacy of the improved method stems from the novel finding of the multiple effect of a catalytic material which serves to control as well as initiate the polymerization reaction. The advantages of a bulk process of this type avoiding the dilution inherent in the use of large quantities of water will be apparent to those skilled in the art. With this method maximum yields of polymer are secured with minimum kettle capacity.

The new improvement may be more readily appreciated and evaluated from a consideration of a typical embodiment of the process.

As noted previously, the starting material is the commercial styrene monomer. This material is first washed with sodium hydroxide and then with water to remove the inhibitors present which, as noted above, generally comprise substituted phenols. The washed unheated monomer is then transferred to a jacketed vessel, preferably a stainless steel kettle, equipped with a scraping type of agitator and with a reflux condenser. The temperature of the batch is raised rapidly to 95° C. while the material is agitated. At this point about 0.11% by weight of phthalimide is introduced. This may conveniently be done by placing the phthalimide powder in a small perforated stainless steel container or basket which is lowered into contact with the heated batch. It is particularly to be observed at this point that the percentage of phthalimide is quite critical. Less than the stated amount has substantially no effect on controlling and particularly on depressing the reaction. Conversely, as much as 0.2% of phthalimide completely inhibits the reaction. It is important therefore that the quantity be carefully controlled particularly in view of the fact that the phthalimide is soluble in cold styrene to the extent of about 2%.

The phthalimide serves a plurality of fortuitous functions in the process. In the first place, it acts as an active catalyst for the polymerization reaction while at the same time functioning as a powerful restrainer of the usual violent polymerization which takes place in bulk reaction. Another important beneficial function of the phthalimide is that it stabilizes the color of the styrene by serving as an inhibitor against the formation of aldehydes which latter tend to color the styrene.

After introduction of the catalyst the temperature of the batch is permitted to rise spontaneously up to the boiling point of styrene, i. e., about 144° C., or slightly higher and up to 148° C. in, for example a 500 pound batch. The elevation in temperature takes place in about 20 minutes. When such temperature is attained cold water is turned into the jacket to maintain the temperature between a range of from 144° C. to 150° C. for a period of 2 hours. Thereafter, the temperature is allowed to rise spontaneously and will elevate to about 160° C. in an additional half hour period.

At the end of this period steam, at 140 pounds pressure, is turned on the jacket and the temperature of the mass is raised to between 175° C. to 180° C. as rapidly as is feasible. It will be found that this point is reached in about 4 hours after the start of the operation. When the temperature of the batch attains 175° C. samples are periodically withdrawn and tested. This may be done by adhering or picking up a boule or wad of the polymer on the end of a rod when the polymer is evidently free of the odor of the monomer. The softening point of the test samples is then determined and when the product displays a softening point of approximately 180° F. the batch is discharged through the discharge valve onto a suitable pan or floor and allowed to cool. It will be found that a characteristic feature of this product is its excellent color; it is glass clear in appearance and compares in this respect most favorably with Lucite. The product may then be treated by the established methods. The product may be compounded on compounding rolls wherein coloring material is added if desired, and is then passed to grinding and screening mechanism to produce the polystyrene molding powder of the desired particle size. The resulting product may then be utilized in any of the currently employed fabrication methods and by utilizing the same technique.

It will be appreciated that while the process has been described based on the use of shipped commercial monomer the new improvement may be utilized directly in a system or plant producing the monomer styrene. Such monomeric styrene, as is known, may be produced by the dehydrogenation of ethyl benzene in a reducing atmosphere after which it is purified by distillation. The purified monomeric styrene may then be used directly in the process herein in which case the preliminary washing out of the inhibitor is not required.

While a preferred operation of the process has been described it is to be understood that this is given didactically to illustrate the underlying principles involved and particularly the novel concept of utilizing a multiple functioning control catalyst to insure an active yet powerfully restrained reaction.

I claim:

1. A method of producing polystyrene which comprises, polymerizing styrene monomer, free from inhibitors, at elevated temperature in the presence of about 0.11% by weight of phthalimide.

2. A method of producing polystyrene which comprises, polymerizing monomeric styrene at elevated temperature in a substantially anhydrous system in the presence of about 0.11% by weight of phthalimide.

3. A method of producing polystyrene which comprises, polymerizing monomeric styrene at elevated temperature in the presence of about 0.11% by weight of phthalimide.

4. A method of producing polystyrene which comprises, polymerizing styrene monomer in the absence of added water and in the presence of about 0.11% by weight of phthalimide.

5. A method of producing polystyrene from commercial styrene monomer which contains inhibitors which comprises, removing the inhibitor from the monomer, heating the monomer to a temperature of 95° C., adding 0.11 per cent of phthalimide and elevating the temperature of the mass to substantially the boiling point of styrene, maintaining such temperature for a period of substantially 2 hours, then elevating the temperature to between approximately 175° C. to 180° C. and maintaining the mass at such temperature until the polymerization is completed.

6. A method of producing polystyrene which comprises, polymerizing styrene monomer in a non-aqueous system and in the presence of 0.11 per cent of phthalimide at a temperature of between 145° C. and 150° C. for a period of substantially 2 hours, then elevating the temperature to between 175° C. to 180° C. and maintaining the reaction at such temperature until polymerization is completed.

7. A method of producing polystyrene which comprises, heating styrene, free from water, to a temperature of approximately 95° C. and reacting the styrene at elevated temperatures and while agitating in the presence of substantially 0.11% by weight of phthalimide.

FRANCIS H. SNYDER.

No references cited.